United States Patent

Sprenger

[15] 3,692,799

[45] Sept. 19, 1972

[54] 5-PHENYL-1-SULFONAMIDOPYRROLE-2-PROPIONIC ACIDS AND CONGENERS

[72] Inventor: William K. Sprenger, Niles, Ill.

[73] Assignee: G. D. Searle & Co., Chicago, Ill.

[22] Filed: July 8, 1970

[21] Appl. No.: 53,335

[52] U.S. Cl............260/326.3, 260/250 A, 424/274
[51] Int. Cl................................................C07d 27/26
[58] Field of Search..................................260/326.3

[56] References Cited

UNITED STATES PATENTS 3,542,788  11/1970  Chinn et al. ..............260/294

*Primary Examiner*—Alex Mazel
*Assistant Examiner*—Joseph A. Narcavage
*Attorney*—John M. Brown, John J. Kolano, Elliot N. Schubert, Lowell C. Bergstedt, Sybil Meloy, Walter C. Ramm and Helmuth A. Wegner

[57] ABSTRACT

Disclosed herein are anti-ulcerogenic, pepsin-inhibiting, anti-bacterial, and anti-protozoal 5-phenyl-1-sulfonamidopyrrole-2-propionic acids and congeners; analgesic, anti-ulcerogenic, and anti-protozoal 2,3,4,5-tetra-hydro-3-hydroxy-6-phenyl-2-sulfonylpyridazine-3-propionic acid γ-lactones and congeners; and the preparation of these compounds from corresponding 4,7-dioxoheptanoic acids and sulfonic acid hydrazides.

21 Claims, No Drawings

5-PHENYL-1-SULFONAMIDOPYRROLE-2-PROPIONIC ACIDS AND CONGENERS

This invention relates to 5-phenyl-1-sulfonamidopyrrole-2-propionic acids and congeners, and to processes for the preparation thereof. More particularly, this invention provides new, useful, and unobvious chemical compounds of the formula

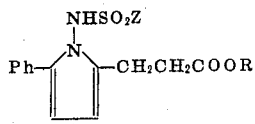

wherein Ph represents phenyl optionally substituted by lower alkyl, lower alkoxy, and/or halogen; Z represents lower alkyl or phenyl, the latter optionally substituted by lower alkyl, lower alkoxy, halogen, and/or nitro; and R represents hydrogen or lower alkyl. From 1 to as many as 5 of the aforesaid optional substituents, alike or different, can be present; and their positioning about the involved benzene rings is not critical. However, when Ph represents phenyl optionally substituted by lower alkyl, a single lower alkyl substituent is preferred, especially methyl; when Ph represents phenyl optionally substituted by lower alkoxy, fewer than 3 lower alkoxy substituents are preferred; and when Ph represents phenyl optionally substituted by halogen, a single halogen substituent is preferred, especially halogen of atomic number less than 53 (i.e., fluorine, chlorine, or bromine) and sometimes less than 35 (i.e., fluorine or chlorine). Further, when Z represents phenyl substituted by lower alkyl, lower alkoxy, or nitro, a single such substituent is preferred, particularly methyl if the substituent be lower alkyl; whereas when Z represents phenyl substituted by halogen, fewer than 4 halogens are preferred, especially halogens of atomic number less than 53.

The lower alkyls comprehended by Ph, Z, and R are typically methyl, ethyl, propyl, isopropyl, butyl, iso-butyl, sec.-butyl, tert.-butyl, pentyl, neopentyl, hexyl, isohexyl, heptyl, and like monovalent, saturated, acyclic, straight- or branched-chain, hydrocarbon groupings of the formula $$-C_nH_{2n+1}$$

wherein $n$ represents a positive integer less than 8. The lower alkoxys comprehended by Ph and Z are defined by the expression

wherein "lower alkyl" has the meaning assigned above; and the halogens comprehended are, of course, fluorine, chlorine, bromine, and iodine.

The compounds to which this invention relates are useful by reason of their valuable biological properties. Thus, for example, they are pepsin-inhibiting, anti-ulcerogenic, anti-bacterial, and anti-protozoal.

The pepsin-inhibiting and anti-ulcerogenic utility of the instant compounds is evident from the results of standardized tests carried out as described in U.S. Pat. No. 3,475,420 and U.S. Pat. No. 3,483,192, respectively. The anti-bacterial and anti-protozoal utility of the instant compounds is evident from the results of standardized tests for their capacity to prevent the growth of Diplococcus pneumoniae and Tetrahymena gelleii, respectively, carried out as also described in the latter patent.

Further evidence of the anti-bacterial utility of the instant compounds is provided by the results of a standardized test for their capacity to prevent the growth of Erwinia sp. In this test, nutrient broth (manufactured by Baltimore Biological Laboratories or Difco) is prepared at twice the concentration recommended by the manufacturer, sterilized, and inoculated with 2 percent (by volume) of a culture of Erwinia sp. Meanwhile, compound is heated in sterile distilled water at a concentration of 2000 γ per ml. and a temperature of 80° C. for 20 min. An equivolume mixture of this compound preparation and the inoculated broth is incubated aerobically at 37° C. for 24–48 hr. and then examined grossly for growth of the test organism. If such growth is observed, the compound is considered inactive. If no growth is observed, the incubated mixture is serially diluted and mixed with an inoculated broth of the same composition as before excepting that the concentration is halved and 1 percent (by volume) of the culture instead of 2 percent is incorporated. Amounts of the latter broth is added such that concentrations of 100, 10, and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

Further evidence of the anti-protozoal utility of the instant compounds is provided by the results of a standardized test for their capacity to immobilize Tetrahymena pyriformis. In this test, a nutrient broth consisting of 12 gm. of proteose peptone, 8 gm. of sucrose, and 500 ml. of water is sterilized and inoculated with 10 percent (by volume) of an axenic culture of T. pyriformis. Meanwhile, compound is heated in sterile distilled water at a concentration of 2000 γ per ml. and a temperature of 80 °C. for 20 min. An equivolume mixture of this compound preparation and the inoculated medium is incubated aerobically at 32° C. for 48 hr. and then examined microscopically for the presence of motile tetrahymena. If any are observed, the compound is considered inactive. If no motile tetrahymena are observed, the incubated mixture is serially diluted and mixed with an inoculated medium of the same composition as that described above excepting that 1000 parts of distilled water instead of 500 parts, and 5 percent (by volume) of the culture instead of 10 percent, are incorporated. Amounts of the latter medium added are such that concentrations of 100, 10, and 1 γ of compound per ml. result. The mixtures thus obtained are incubated as before and then examined microscopically for motile tetrahymena. Potency is expressed as the minimum concentration at which no motile tetrahymena are discernible. Controls are provided by concurrent incubations identical with the foregoing except for the absence of compound.

Those skilled in the art will recognize that observations of activity in standardized tests for particular biological effects are fundamental to the development of valuable new drugs, both veterinary and human.

Preparation of the subject compounds proceeds by heating a 4,7-dioxoheptanoic acid of the formula PhCOCH$_2$CH$_2$COCH$_2$CH$_2$COOH with a sulfonic acid hydrizide of the formula

ZSO$_2$NHNH$_2$

[Ph and Z being defined as before], using benzene as the reaction medium and p-toluenesulfonic acid monohydrate as a condensing agent. The resultant 1-sulfonamidopyrrole-2-propionic acids are isolated by stripping the solvent from the reaction mixture, extracting the residue with aqueous sodium bicarbonate, adding excess hydrochloric acid to the extract, and filtering. The acids are esterified by heating with an alcohol of the formula lower alkyl-OH in the presence of sulfuric acid.

By-products of the reaction between the aforesaid 4,7-dioxoheptanoic acids and sulfonic acid hydrazides, insoluble in bicarbonate and so isolated from the reaction mixture, are 2,3,4,5-tetrahydro-3-hdroxy-6-phenyl-2-sul-fonylpyridazine-3-propionic acid γ-lactones and congeners of the formula

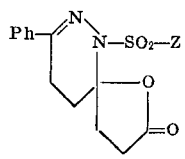

[Ph and Z being defined as before] useful by reason of their valuable analgesic, anti-ulcerogenic, and anti-protozoal properties. They lack the pepsin-inhibiting utility of the compounds hereinafter claimed.

The anti-ulcerogenic utility of the instant lactones and their anti-protozoal utility in respect of T. pyriformis, are evidenced from the results of the standardized tests described above, whereas the analgesic utility of these lactones is evident from the results of a standardized test for their capacity to prolong the reaction time of mice to a clip applied to the tail. The procedure is essentially that of Haffner, Dtsch. med. Wschr., 55, 731 (1929), as described by Bianchi and Franceschini, Brit. J. Pharmacol., 9, 280 (1954), modified in certain particulars as follows: A pressure-standardized artery clip is placed 1 inch from the base of the tail of each of a group of adult, male, albino, Charles River mice weighing 18–25 gm.; and 10 animals are selected therefrom which respond to the clip by turning, biting, or the like within 15 sec. The response times for these 10 animals are recorded, the clips are removed, and 50 mg. per kg. of test compound is thereupon administered to each animal via intraperitoneal injection. Solid compounds are prepared for injection by mixing 25 mg. with approximately 0.2 ml. of a 50:50 (by volume) mixture of propylene glycol and Tween 80, then diluting to 5 ml. with water and homogenizing; liquid compounds are prepared by warming 25 mg. with 1 ml. of 50:50 (by volume) propylene glycol and Tween 80, then diluting to 5 ml. with aqueous 10 percent gum acacia. At 30-min. intervals during the 2 hr. immediately following administration, the clips are replaced on the tails for a maximum of 30 sec. in each instance, during which response times are recorded as before. If, at one or more intervals, response times for at least half of the animals are more than twice as long as prior to compound administration, the compound is considered to be analgesic.

The following examples describe in detail compounds illustrative of the present invention, methods which have been devised for their preparation, and by-products thereof. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

2,3,4,5-Tetrahydro-3-hydroxy-2-methylsulfonyl-6-phenylpyridazine-3-propionic acid γ-lactone and 1-methane-sulfonamido-5-phenylpyrrole-2-propionic acid. A mixture of 94 parts of 4,7-dioxo-7-phenylheptanoic acid, 44 parts of methanesulfonic acid hydrazide, 1 part of p-toluenesulfonic acid monohydrate, and 3600 parts of benzene is heated at the boiling point under reflux for 2 hrs., water being removed as formed. Solvent is stripped by vacuum distillation, whereupon the residue is extracted with approximately 2000 parts of warm aqueous 5 percent sodium bicarbonate.

Bicarbonate-insoluble material is taken up in a minimum of hot methanol. The methanol solution is mixed with decolorizing charcoal and then filtered. From the filtrate, on cooling, colorless plates of 2,3,4,5-tetrahydro-3-hydroxy-2-methylsulfonyl-6-phenylpyridazine-3-propionic acid γ-lactone crystallizes. Isolated by filtration and dried in vacuo at 60°–65°, it melts at 171°–173°. It has the formula

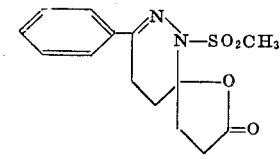

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is taken up in a minimum of hot aqueous methanol. The resultant solution is mixed with decolorizing charcoal and then filtered. From the filtrate, on cooling, cream-colored 1-methanesulfonamido-5-phenylpyrrole-2-propionic acid crystallizes. Isolated by filtration and dried in vacuo at 60°–65, it melts at 187°–189°. It has the formula

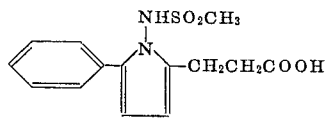

EXAMPLE 2

Ethyl 1-methanesulfonamido-5-phenylpyrrole-2-propionate. Approximately 90 parts of 1-methanesulfonamido-5-phenylpyrrole-2-propionic acid, 1200 parts of anhydrous ethanol, and approximately 2 parts of concentrated sulfuric acid is heated at the boiling point under reflux for 24 hours, then mixed with approximately 1000 parts of hexane. Decolorizing charcoal is added and the resultant mixture is filtered. From the filtrate, on chilling to around 5°, colorless prisms of ethyl 1-methanesulfonamido-5-phenyl-pyrrole-2-propionate precipitate. Collected by filtration and dried in vacuo at 60°–65°, the product melts at approximately 111°–112°. It has the formula

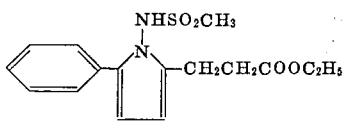

EXAMPLE 3

2-Butylsulfonyl-2,3,4,5-tetrahydro-3-hydroxy-6-phenylpyridazine-3-propionic acid γ-lactone and 1-butane-sulfonamido-5-phenylpyrrole-2-propionic acid. A mixture of 94 parts of 4,7-dioxo-7-phenylheptanoic acid, 60 parts of butanesulfonic acid hydrazide, 1 part of p-toluenesulfonic acid monohydrate, and 3600 parts of benzene is heated at the boiling point under reflux for 3 hours, water being removed as formed. Solvent is stripped by vacuum distillation, whereupon the residue is extracted with approximately 2,000 parts of warm aqueous 5 percent sodium bicarbonate.

The bicarbonate-insoluble material is 2-butyl-sulfonyl-2,3-4-5-tetrahydro-3-hydroxy-6-phenylpyridazine-3-propionic acid γ-lactone, having the formula

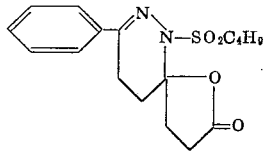

The bicarbonate extract is acidified with 10 percent hydrochloric acid, and the resultant mixture is extracted with ether. The ether extract is washed with water, dried over magnesium sulfate, and stripped of solvent by vacuum distillation. The residue is 1-butanesulfonamido-5-phenylpyrrole-2-propionic acid, having the formula

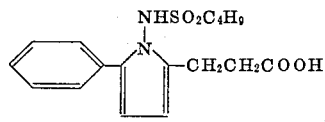

EXAMPLE 4

2,3,4,5-Tetrahydro-3-hydroxy-2-methylsulfonyl-6-(p-tolyl)pyridazine-3-propionic acid γ-lactone and 1-methanesulfonamido-5-(p-tolyl)pyrrole-2-propionic acid. Substitution of 100 parts of 4,7-dioxo-7-(p-tolyl)heptanoic acid and 44 parts of methanesulfonic acid hydrazide for the 4,7-dioxo-7-phenylheptanoic acid and butanesulfonic acid hydrazide, respectively, called for in Example 3 affords, by the procedure there detailed, 2,3,4,5-tetrahydro-3-hydroxy-2-methylsulfonyl-6-(p-tolyl)pyridazine-3-propionic acid γ-lactone, having the formula

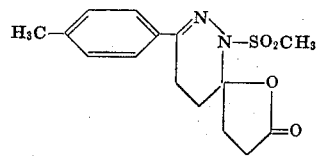

and 1-methanesulfonamido-5-(p-tolyl)pyrrole-2-propionic acid, having the formula

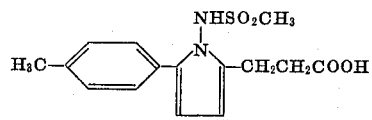

EXAMPLE 5

6-(p-Fluorophenyl)-2,3,4,5-tetrahydro-3-hydroxy-2-methylsulfonylpyridazine-3-propionic acid γ-lactone and 5-(p-fluorophenyl)-1-methanesulfonamidopyrrole-2-propionic acid. A mixture of 200 parts of 7-(p-fluorophenyl)-4,7-dioxoheptanoic acid, 88 parts of methanesulfonic acid hydrazide, 1 part of p-toluenesulfonic acid monohydrate, and 10,800 parts of benzene is heated at the boiling point under reflux for 1½ hours, water being removed as formed. Solvent is stripped by vacuum distillation, whereupon the resudue is extracted with approximately 4,000 parts of warm aqueous 5 percent sodium bicarbonate.

Bicarbonate-insoluble material is taken up in a minimum of hot isopropyl alcohol. The alcohol solution is mixed with decolorizing charcoal and then filtered. From the filtrate, on cooling, 6-(p-fluorophenyl)-2,3,4,5-tetra-hydro-3-hydroxy-2-methylsulfonylpyridazine-3-propionic acid γ-lactone crystallizes. Isolated by filtration and dried in vacuo at 60°–65°, it melts at approximately 153°–154°. It has the formula

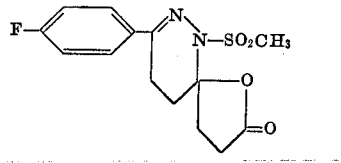

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is taken up in a minimum of hot aqueous methanol. The resultant solution is mixed with decolorizing charcoal and then filtered. From the filtrate, on cooling, 5-(p-fluorophenyl)-1-methane-sulfonamidopyrrole-2-propionic acid crystallizes. Isolated by filtration and dried in vacuo at 60°–65, it melts at 168°–170°. It has the formula

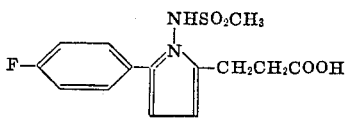

EXAMPLE 6

2-Butylsulfonyl-6-(p-chlorophenyl)-2,3,4,5-tetrahydro-3-hydroxypyridazine-3-propionic acid γ-lactone and 1-butanesulfonamido-5-(p-chlorophenyl)pyrrole-2-propionic acid. A mixture of 108 parts of 7-(p-chlorophenyl)-4,7-dioxoheptanoic acid, 62 parts of butanesulfonic acid hydrazide, 1 part of p-toluenesulfonic acid monohydrate, and 4,500 parts of benzene is heated at the boiling point under reflux for 2 hours, water being removed as formed. Solvent is stripped by vacuum distillation, whereupon the residue is extracted with approximately 2,000 parts of warm aqueous 5 percent sodium bicarbonate.

Bicarbonate-insoluble material is taken up in a minimum of hot isopropyl alcohol. The alcohol solution is mixed with decolorizing charcoal and then filtered. From the filtrate, on cooling, 2-butylsulfonyl-6-(p-chlorophenyl)-2,3,4,5-tetrahydro-3-hydroxypyridazine-3-propionic acid γ-lactone crystallizes. Isolated by filtration and dried in vacuo at 60°–65°, it melts at approximately 158°–159°. It has the formula

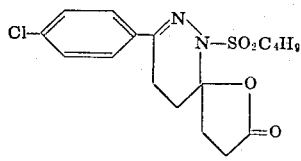

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is taken up in a minimum of hot aqueous methanol. The resultant solution is mixed with decolorizing charcoal and then filtered. From the filtrate, on cooling, 1-butanesulfonamido-5-(p-chlorophenyl)pyrrole-2-propionic acid crystallizes. Isolated by filtration and dried in vacuo at 60°–65, it melts at 228°–230°. It has the formula

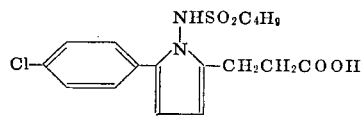

EXAMPLE 7

6-(m-Bromophenyl)-2-butylsulfonyl-2,3,4,5-tetrahydro-3-hydroxypyridazine-3-propionic acid γ-lactone and 1-butanesulfamido-5-(m-bromophenyl)pyrrole-2-propionic acid. Substitution of 124 parts of 7-(m-bromophenyl-4,7-dioxoheptanoic acid for the 4,7-dioxo-7-phenylheptanoic acid called for in Example 3 and doubling the amounts of benzene and aqueous bicarbonate prescribed therein affords, by the procedure there detailed, 6-(m-bromophenyl)-2-butylsulfonyl-2,3,4,5-tetrahydro-3-hydroxypyridazine-3-propionic acid γ-lactone, of the formula

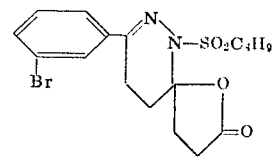

and 1-butanesulfonamido-5-(m-bromophenyl)pyrrole-2-propionic acid, of the formula

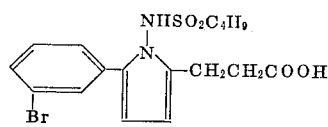

EXAMPLE 8

2-Butylsulfonyl-2,3,4,5-tetrahydro-3-hydroxy-6-(p-iodophenyl)pyridazine-3-propionic acid γ-lactone and 1-butanesulfonamido-5-(p-iodophenyl)pyrrole-2-propionic acid. Substitution of 124 parts of 7-(p-iodophenyl)-4,7-dioxoheptanoic acid [prepared from p-idodoacetophenone and 2-furaldehyde by the procedure described in U.S. Pat. No. 3,349,091(Example 1, Parts A and B) for the preparation of 7-(o-fluorophenyl)-4,7-dioxoheptanoic acid] for the 4,7-dioxo-7-phenylheptanoic acid called for in Example 3 and increasing the amounts of benzene and aqueous bicarbonate prescribed therein to 9,000 and 4,000 parts, respectively, affords, by the procedure there detailed, 2-butylsulfonyl-2,3,4,5-tetrahydro-3-hydroxy-6-(p-iodophenyl)pyridazine-3-propionic acid γ-lactone, of the formula

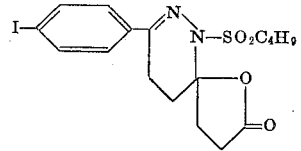

and 1-butanesulfonamido-5-(p-iodophenyl)pyrrole-2-propionic acid, of the formula

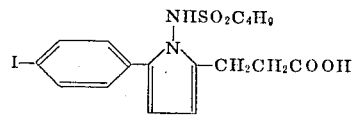

EXAMPLE 9

2,3,4,5-Tetrahydro-3-hydroxy-6-(p-methoxyphenyl)-2-methylsulfonylpyridazine-3-propionic acid γ-lactone and 5-(p-methoxyphenyl)-1-methanesulfonamidopyrrole-2-propionic acid. Substitution of 212 parts of 7-(p-methoxypehnyl)-4,7-dioxoheptanoic acid and 88 parts of methanesulfonic acid hydrazide for the 7-(p-chlorophenyl)-4,7-dioxoheptanoic acid and butanesulfonic acid hydrazide, respectively, called for in Example 6 and increasing the amounts of benzene and aqueous bicarbonate prescribed therein to 10,800 and 4000 parts, respectively, affords, by the procedure there detailed, 2,3,4,5-tetrahydro-3-hydroxy-6-(p-methoxyphenyl)-2-methylsulfonylpyridazine-3-propionic acid γ-lactone melting at approximately 151°–152°, of the formula

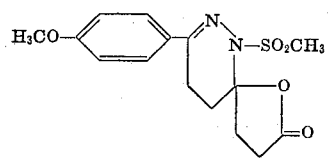

and 5-(p-methoxyphenyl)-1-methanesulfonamidopyrrole-2-propionic acid melting at approximately 191°–192°, of the formula

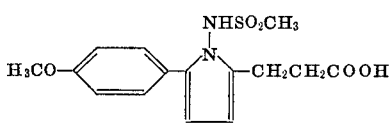

EXAMPLE 10

6-(m-Ethoxyphenyl)-2,3,4,5-tetrahydro-3-hydroxy-2-methylsulfonylpyridazine-3-propionic acid γ-lactone and 5-(m-ethoxyphenyl)-1-methanesulfonamidopyrrole-2-propionic acid. Substitution of 112 parts of 7-(m-ethoxyphenyl)-4,7-dioxoheptanoic acid and 44 parts of methanesulfonic acid hydrazide for the 4,7-dioxo-7-phenylheptanoic acid and butanesulfonic acid hydrazide respectively, called for in Example 3 and increasing the amount of benzene prescribed therein from 3,600 to 5,400 parts affords, by the procedure there detailed, 6-(m-ethoxyphenyl)-2,3,4,5-tetrahydro-3-hydroxy-2-methylsulfonylpyridazine-3-propionic acid γ-lactone of the formula

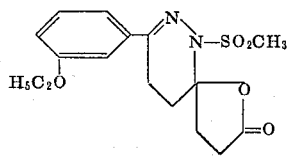

and 5-(m-ethoxyphenyl)-1-methanesulfonamidopyrrole-2-propionic acid, of the formula

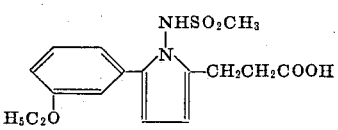

EXAMPLE 11

2-Butylsulfonyl-2,3,4,5-tetrahydro-3-hydroxy-6-(p-methoxyphenyl)pyridazine-3-propionic acid γ-lactone and 1-butanesulfonamido-5-(p-methoxyphenyl)pyrrole-2-propionic acid. Substitution of 106 parts of 7-(p-methoxyphenyl)-4,7-dioxoheptanoic acid for the 7-(p-chlorophenyl)-4,7-dioxoheptanoic acid called for in Example 6 and increasing the amount of benzene prescribed therein from 4,500 to 5,400 parts affords, by the procedure there detailed, 2-butyl-sulfonyl-2,3,4,5-tetrahydro-3-hydroxy-6-(p-methoxyphenyl)pyridazine-3-propionic acid γ-lactone melting at approximately 110°–111°, of the formula

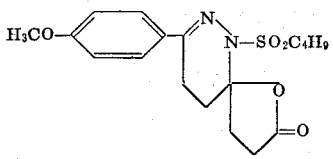

and 1-butanesulfonamido-5-(p-methoxyphenyl)pyrrole-2propionic acid melting at approximately 169°–170°, of the formula

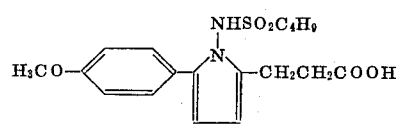

EXAMPLE 12

6-(p-Chlorophenyl)-2,3,4,5-tetrahydro-3-hydroxy-2-phenylsulfonylpyridazine-3-propionic acid γ-lactone and 1-benzenesulfonamido-5-(p-chlorophenyl)pyrrole-2-propionic acid. Substitution of 70 parts of benzenesulfonic acid hydrazide for the butanesulfonic acid hydrazide called for in Example 6 and decreasing the amount of benzene prescribed therein from 4,500 to 3,600 parts affords, by the procedure there detailed, 6-(p-chlorophenyl)-2,3,4,5-tetrahydro-3-hydroxy-2-phenylsulfonylpyridazine-3-propionic acid γ-lactone melting at approximately 175°–176°, of the formula

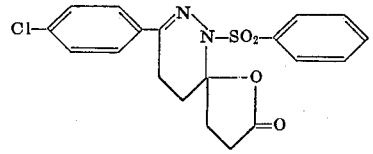

and 1-benzenesulfonamido-5-(p-chlorophenyl)pyrrole-2-propionic acid melting at approximately 194°–195°, of the formula

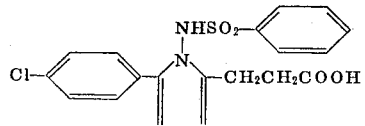

EXAMPLE 13

6-(o-Fluorophenyl)-2,3,4,5-tetrahydro-3-hydroxy-2-phenylsufonylpyridazine-3-propionic acid γ-lactone and 1-benzenesulfonamido-5-(o-fluorophenyl)pyrrole-2-propionic acid. Substitution of 102 parts of 7-(o-fluorophenyl)-4,7-dioxoheptanoic acid and 70 parts of benzenesulfonic acid hydrazide for the 4,7-dioxo-7-phenylheptanoic acid and butanesulfonic acid hydrazide, respectively, called for in Example 3 and increasing the amount of benzene prescribed therein from 3,600 to 4,500 parts affords, by the procedure there detailed, 6-(o-fluorophenyl)-2,3,4,5-tetrahydro-3-hydroxy-2-phenylsulfonylpyridzaine-3-propionic acid γ-lactone, of the formula

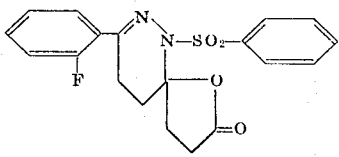

and 1-benzenesulfonamido-5-(o-fluorophenyl)pyrrole-2-propionic acid, of the formula

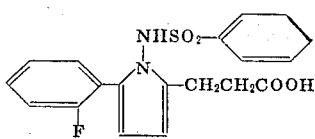

EXAMPLE 14

2,3,4,5-Tetrahydro-3-hydroxy-6-(p-methoxyphenyl)-2-phenylsulfonylpyridazine-3-propionic acid γ-lactone and 1-benzenesulfonamido-5-(p-methoxyphenyl)pyrrole-2-propionic acid. Substitution of 132 parts of 7-(p-methoxyphenyl)-4,7-dioxoheptanoic acid and 86 parts of benzenesulfonic acid hydrazide for the 4,7-dioxo-7-phenylheptanoic acid and methanesulfonic acid hydrazide, respectively, called for in Example 1 and increasing the amount of benzene and the reaction time prescribed therein to 4500 parts and 3 hours, respectively, affords, by the procedure there detailed, 2,3,4,5-tetrahydro-3-hydroxy-6-(p-methoxyphenyl)-2-phenyl-sulfonylpyridazine-3-propionic acid γ-lactone melting at approximately 160°–161°, of the formula

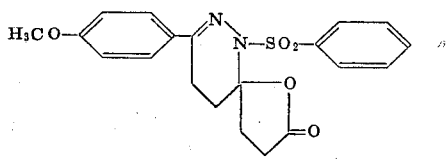

and 1-benzenesulfonamido-5-(p-methoxyphenyl)pyrrole-2-propionic acid melting at approximately 154°–155°, of the formula

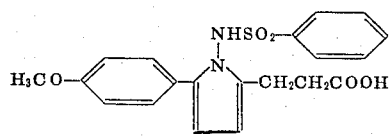

EXAMPLE 15

Methyl 1-benzenesulfonamido-5-(p-methoxyphenyl)-pyrrole-2-propionate. A mixture of 60 parts of 1-benzene-sulfonamido-5-(p-methoxyphenyl)pyrrole-2-propionic acid, approximately 2 parts of concentrated sulfuric acid, and 1,600 parts of methanol is heated at the boiling point under reflux for 5 hours, then diluted with one-half volume of water. Decolorizing charcoal is added and the resultant mixture is rapidly heated to the boiling point and filtered hot. From the filtrate, on chilling to around 5°, colorless needles of methyl 1-benzenesulfonamido-5-(p-methoxyphenyl)pyrrole-2-propionate crystallize. Isolated by filtration and dried in vacuo at 60°–65°, the product melts at 121°–123°. It has the formula

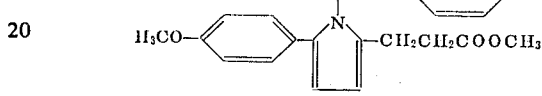

EXAMPLE 16

6-(m-Ethoxyphenyl)-2,3,4,5-tetrahydro-3-hydroxy-2-phenylsulfonylpyridazine-3-propionic acid γ-lactone and 1-benzenesulfonamido-5-(m-ethoxyphenyl)pyrrole-2-propionic acid. Substitution of 112 parts of 7-(m-ethoxyphenyl)-4,7-dioxoheptanoic acid and 70 parts of benzenesulfonic acid hydrazide for the 4,7-dioxo-7-phenylheptanoic acid and butanesulfonic acid hydrazide, respectively, called for in Example 3, and increasing the amount of benzene prescribed therein from 3,600 to 4,500 parts affords, by the procedure there detailed, 6-(m-ethoxyphenyl)-2,3,4,5-tetrahydro-3-hydroxy-2-phenylsulfonylpyridazine-3-propionic acid γ-lactone, of the formula

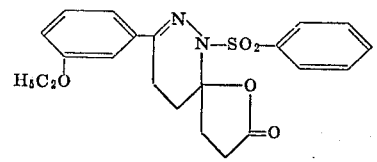

and 1-benzenesulfonamido-5-(m-ethoxyphenyl)pyrrole-2-propionic acid, of the formula

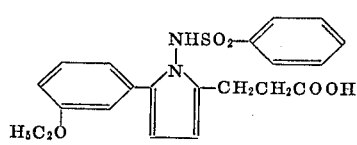

EXAMPLE 17

6-(p-Fluorophenyl)-2,3,4,5-tetrahydro-3-hydroxy-2-(p-tolylsulfonyl)pyridazine-3-propionic acid γ-lactone and 5-(p-fluorophenyl)-1-(p-toluenesulfonamido)pyrrole-2-propionic acid. A mixture of 100 parts of 7-(p-fluoro-phenyl)-4,7-dioxoheptanoic acid, 74 parts of p-toluenesulfonic acid hydrazide, 1 part of p-toluenesulfonic acid monohydrate, and 4,500 parts of benzene is heated at the boiling point under reflux for 2 hours, water being removed as formed. Solvent is stripped by vacuum distillation, whereupon the residue is extracted with approximately 2,000 parts of warm aqueous 5 percent sodium bicarbonate.

The bicarbonate-insoluble material is 6-(p-fluorophenyl)-2,3,4,5-tetrahydro-3-hydroxy-2-(p-tolylsulfonyl)pyridazine-3-propionic acid γ-lactone, of the formula

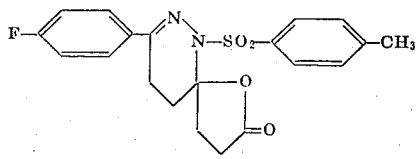

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is 5-(p-fluorophenyl)-1-(p-toluenesulfonamido)pyrrole-2-propionic acid melting at approximately 185°–186°. It has the formula

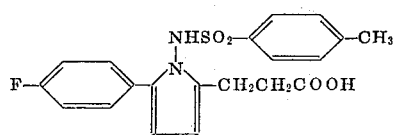

EXAMPLE 18

6-(m-Bromophenyl)-2,3,4,5-tetrahydro-3-hydroxy-2-(o-tolylsulfonyl)pyridazine-3-propionic acid γ-lactone and 5-(m-bromophenyl)-1-(o-toluenesulfonamido)pyrrole-2-propionic acid. Substitution of 126 parts of 7-(m-bromo-phenyl)-4,7-dioxoheptanoic acid and 74 parts of o-toluenesulfonic acid hydrazide for the 4,7-dioxo-7-phenyl-heptanoic acid and butanesulfonic acid hydrazide, respectively, called for in Example 3 and increasing the amount of benzene prescribed from 3,600 to 5,400 parts affords, by the procedure there detailed, 6-(m-bromophenyl)-2,3,4,5-tetrahydro-3-hydroxy-2-(o-tolysulfonyl)pyridazine-3-propionic acid γ-lactone, of the formula

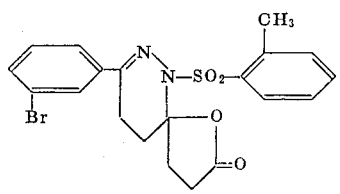

and 5-(m-bromophenyl)-1-(o-toluenesulfonamido)pyrrole-2-propionic acid, of the formula

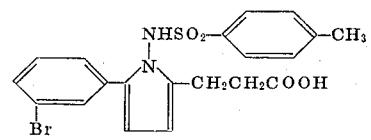

EXAMPLE 19

6-(p-Bromophenyl)-2-(p-chlorophenylsulfonyl)-2,3,4,5-tetrahydro-3-hydroxypyridazine-3-propionic acid γ-lactone and 5-(p-bromophenyl)-1-(p-chlorobenzene-sulfonamido)pyrrole-2-propionic acid. Substitution of 156 parts of 7-(p-bromophenyl)-4,7-dioxoheptanoic acid and 104 parts of p-chlorobenzenesulfonic acid hydrazide for the 7-(p-chlorophenyl)-4,7-dioxoheptanoic acid and butanesulfonic acid hydrazide, respectively, called for in Example 6 and increasing the amount of benzene prescribed therein from 4,500 to 5,400 parts affords, by the procedure there detailed, 6-(p-bromophenyl)-2-(p-chlorophenylsulfonyl)-2,3,4,5-tetrahydro-3-hydroxypyridazine-3-propionic acid γ-lactone melting at approximately 168°–169°, of the formula

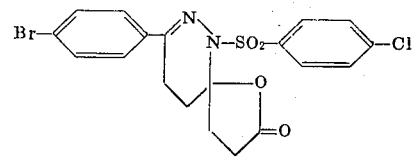

and 5-(p-bromophenyl)-1-(p-chlorobenzylsulfonamido)pyrrole-2-propionic acid melting at approximately 209°–210°, of the formula

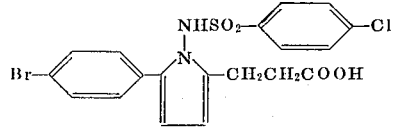

EXAMPLE 20

6-(o-Fluorophenyl)-2-(p-fluorophenylsulfonyl)-2,3,4,5-tetrahydro-3-hydroxypyridazine-3-propionic acid γ-lactone and 1-(p-fluorobenzenesulfonamido)-5-(o-fluoro-phenyl)pyrrole-2-propionic acid. Substitution of 102 parts of 7-(o-fluorophenyl)-4,7-dioxoheptanoic acid and 90 parts of p-fluorobenzenesulfonic acid hydrazide for the 4,7-dioxo-7-phenyl-heptanoic acid and butanesulfonic acid hydrazide, respectively, called for in Example 3 and increasing the amount of benzene prescribed therein from 3,600 to 4,500 parts affords, by the procedure there detailed, 6-(o-fluorophenyl)-2-(p-fluorophenylsulfonyl)-2,3,4,5-tetrahydro-3-hydroxypyridazine-3-propionic acid γ-lactone, of the formula

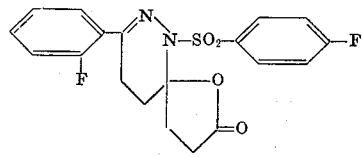

and 1-(p-fluorobenzenesulfonamido)-5-(o-fluorophenyl)pyrrole-2-propionic acid, of the formula

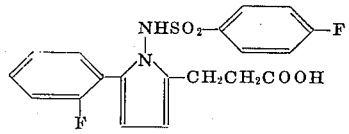

EXAMPLE 21

2,3,4,5-Tetrahydro-3-hydroxy-6-(p-iodophenyl)-2-(p-iodophenylsulfonyl)pyridazine-3-propionic acid γ-lactone and 1-(p-iodobenzenesulfonamido)-5-(p-iodophenyl)pyrrole-2-propionic acid. Substitution of 72 parts of 7-(p-iodophenyl)-4,7-dioxoheptanoic acid and 60 parts of p-iodobenzenesulfonic acid hydrazide for the 4,7-dioxo-7-phenylheptanoic acid and butanesulfonic acid hydrazide, respectively, called for in Example 3 affords, by the procedure there detailed, 2,3,4,5-tetrahydro-3-hydroxy-6(p-iodophenyl)-2-(p-iodophenylsulfonyl)pyridazine-3-propionic acid γ-lactone, of the formula

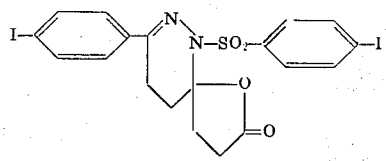

and 1-(p-iodobenzenesulfonamido)-5-(p-iodophenyl)pyrrole-2-propionic acid, of the formula

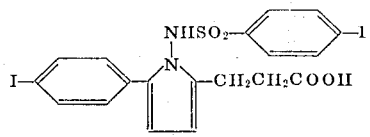

EXAMPLE 22

2-(p-Fluorophenylsulfonyl)-2,3,4,5-tetrahydro-3-hydroxy-6-(p-methoxyphenyl)pyridazine-3-propionic acid γ-lactone and 1-(p-fluorobenzenesulfonamido)-5-(p-methoxy-phenyl)pyrrole-2-propionic acid. A mixture of 126 parts of 7-(p-methoxyphenyl)-4,7-dioxoheptanoic acid, 90 parts of p-fluorobenzenesulfonic acid hydrazide, 1 part of p-toluene-sulfonic acid monohydrate, and 4500 parts of benzene is heated at the boiling point under reflux for 2 hours, water being removed as formed. Solvent is stripped by vacuum distillation, whereupon the residue is extracted with approximately 2000 parts of warm aqueous 5 percent sodium bicarbonate.

The bicarbonate-insoluble material is 2-(p-fluorophenylsulfonyl)-2,3,4,5-tetrahydro-3-hydroxy-6-(p-methoxyphenyl)pyridazine-3-propionic acid γ-lactone, having the formula

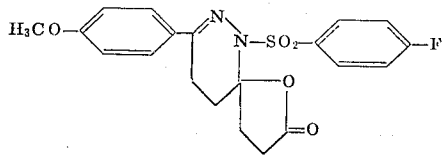

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is taken up in a minimum of hot aqueous isopropyl alcohol. The resultant solution is mixed with decolorizing charcoal and then filtered. From the filtrate, on cooling, 1-(p-fluorobenzenesulfonamido)-5-(p-methoxyphenyl)pyrrole-2-propionic acid crystallizes. Isolated by filtration and dried in vacuo at 60°–65°, it melts at approximately 170°–171°. It has the formula

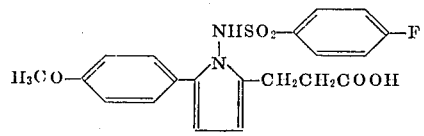

EXAMPLE 23

2-(p-Bromophenylsulfonyl)-6-(m-ethoxyphenyl)-2,3,4,5-tetrahydro-3-hydroxypyridazine-3-propionic acid γ-lactone and 1-(p-bromobenzenesulfonamido)-5-(m-ethoxy-phenyl)pyrrole-2-propionic acid. Substitution of 140 parts of 7-(m-ethoxyphenyl)-4,7-dioxoheptanoic acid and 126 parts of p-bromobenzenesulfonic acid hydrazide for the 7-(p-chlorophenyl)-4,7-dioxoheptanoic acid and butanesulfonic acid hydrazide, respectively, called for in Example 6 and shortening the reaction time prescribed therein from 2 to 1½ hours affords, by the procedure there detailed, 2-(p-bromophenylsulfonyl)-6-(m-ethoxyphenyl)-2,3,4,5-tetrahydro-3-hydroxypyridazine-3-propionic acid γ-lactone melting at approximately 169°–170°, of the formula

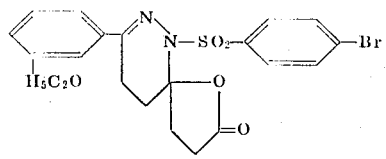

and 1-(p-bromobenzenesulfonamido)-5-(m-ethoxyphenyl)pyrrole-2-propionic acid melting at approximately 177°–178°, of the formula

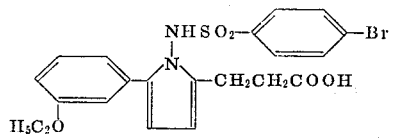

EXAMPLE 24

2-(2,4,5-Trichlorophenylsulfonyl)-2,3,4,5-tetrahydro-3-hydroxy-6-(p-methoxyphenyl)pyridazine-3-propionic acid γ-lactone and 1-(2,4,5-trichlorobenzenesulfonamido)-5-(p-methoxyphenyl)pyrrole-2-propionic acid. A mixture of 106 parts of 7-(p-methoxyphenyl)-4,7-dioxoheptanoic acid, 110 parts of 2,4,5-trichlorobenzenesulfonic acid hydrazide, 1 part of p-toluenesulfonic acid monohydrate, and 4,500 parts of benzene is heated at the boiling point under reflux for 3 hours, water being removed as formed. Solvent is stripped by vacuum distillation, whereupon the residue is extracted with approximately 2,000 parts of warm aqueous 5 percent sodium bicarbonate.

The bicarbonate-insoluble material is 2-(2,4,5-trichlorophenylsulfonyl)-2,3,4,5-tetrahydro-3-hydroxy-6-(p-methoxyphenyl)pyridazine-3-propionic acid γ-lactone, of the formula

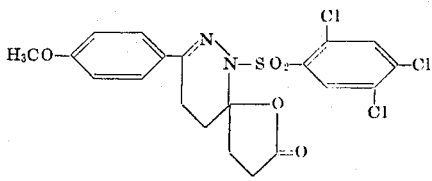

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is taken up in a minimum of hot aqueous isopropyl alcohol. The resultant solution is mixed with decolorizing charcoal and then filtered. From the filtrate, on cooling, 1-(2,4,5-trichlorobenzenesulfonamido)-5-(p-methoxyphenyl)pyrrole-2-propionic acid crystallizes. Isolated by filtration and dried in vacuo at 60°–65°, it melts at approximately 230°–231°. It has the formula

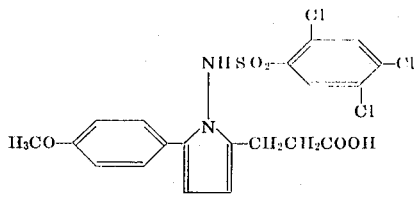

EXAMPLE 25

2,3,4,5-Tetrahydro-3-hydroxy-6-(2,5-dimethoxyphenyl)-2-(p-methoxyphenylsulfonyl)pyridazine-3-propionic acid γ-lactone and 1-(p-methoxybenzenesulfonamido)-5-(2,5-dimethoxyphenyl)pyrrole-3-propionic acid. A mixture of 160 parts of 7-(2,5-methoxyphenyl)-4,7-dioxoheptanoic acid [prepared from 2,5-dimethoxyacetophenone and 2-fural-dehyde by the procedure described in U.S. Pat. No. 3,349,091 (Example 1, parts A and B) for the preparation of 7-(o-fluorophenyl)-4,7-dioxoheptanoic acid], 110 parts of p-methoxybenzenesulfonic acid hydrazide, 1 part of p-toluene-sulfonic acid monohydrate, and 4,500 parts of benzene is heated at the boiling point under reflux for 1½ hours, water being removed as formed. Solvent is stripped by vacuum distillation, whereupon the residue is extracted with approximately 2,000 parts of warm aqueous 5 percent sodium bicarbonate.

Bicarbonate-insoluble material is taken up in a minimum of hot isopropyl alcohol. The alcohol solution is mixed with decolorizing charcoal and then filtered. From the filtrate, on cooling, 2,3,4,5-tetrahydro-3-hydroxy-6-(2,5-dimethoxyphenyl)-2-(p-methoxyphenylsulfonyl)pyridazine-3-propionic acid γ-lactone crystallizes. Isolated by filtration and dried in vacuo at 60°–65, it melts at approximately 160°–161°. It has the formula

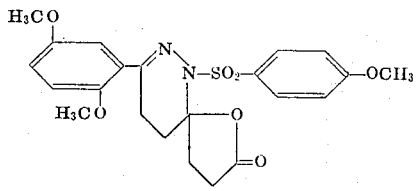

The bicarbonate extract is acidified with 10 percent hydrochloric acid, and the mixture which eventuates is extracted with ether. The ether extract is washed with water, dried over magnesium sulfate, and stripped of solvent by vacuum distillation. The residue is taken up in a minimum of hot aqueous isopropyl alcohol. The resultant solution is mixed with decolorizing charcoal and then filtered. From the filtrate, on cooling, 1-(p-methoxybenzene-sulfonamido)-5-(2,5-dimethoxyphenyl)pyrrole-2-propionic acid crystallizes. Isolated by filtration and dried in vacuo at 60°–65°, it melts at approximately 198°–199°. It has the formula

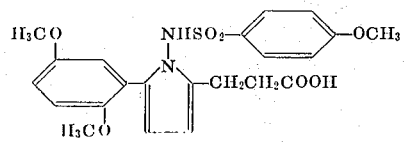

EXAMPLE 26

6-(m-Ethoxyphenyl)-2-(p-ethoxyphenylsulfonyl)-2,3,4,5-tetrahydro-3-hydroxypyridazine-3-propionic acid γ-lactone and 1-(p-ethoxybenzenesulfonamido)-5-(m-ethoxy-phenyl)pyrrole-2-propionic acid. Substitution of 112 parts of 7-(m-ethoxyphenyl)-4,7-dioxoheptanoic acid and 88 parts of p-ethoxybenzenesulfonic acid hydrazide for the 4,7-dioxo-7-phenylheptanoic acid and butanesulfonic acid hydrazide, respectively, called for in Example 3 affords, by the procedure there detailed 6-(m-ethoxyphenyl)-2-(p-ethoxyphenyl-sulfonyl)- 2,3,4,5-tetrahydro-3-hydroxypyridazine-3-propionic acid γ-lactone, of the formula

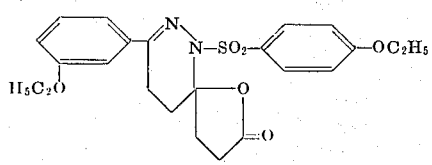

and 1-(p-ethoxybenzenesulfonamido)-5-(m-ethoxyphenyl)pyrrole-2-propionic acid, of the formula

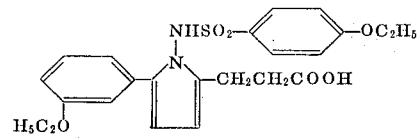

EXAMPLE 27

6-(p-Bromophenyl)-2,3,4,5-tetrahydro-3-hydroxy-2-(p-nitrophenylsulfonyl)pyridazine-3-propionic acid γ-lactone and methyl 5-(p-bromophenyl)-1-(p-nitrobenzene-sulfonamido)pyrrole-2-propionate. Substitution of 126 parts of 7-(p-bromophenyl)-4,7-dioxoheptanoic acid and 86 parts of p-nitrobenzenesulfonic acid hydrazide for the 4,7-dioxo-7-phenylheptanoic acid and butanesulfonic acid hydrazide, respectively, called for in Example 3, increasing the amount of benzene prescribed from 3,600 to 4,500 parts, and shortening the reaction time to 1 hour affords, by the procedure there detailed, 6-(p-bromophenyl)-2,3,4,5-tetrahydro-3-hydroxy-2-(p-nitrophenylsufonyl)pyridazine-3-propionic acid γ-lactone, of the formula

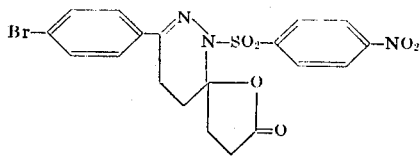

and 5-(p-bromophenyl)-1-(p-nitrobenzenesulfonamido)pyrrole-2-propionic acid.

The latter product is heated for 2 hours at 90°–95° with 2,300 parts of methanol containing approximately 4 parts of sulfuric acid. From the resultant mixture, on cooling, yellow methyl 5-(p-bromophenyl)-1-(p-nitrobenzenesulfonamido)-pyrrole-2-propionate crystallizes. Isolated by filtration and dried in vacuo at 60°–65, it melts at 227°–230°. It has the formul

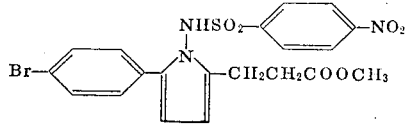

EXAMPLE 28

6-(o-Fluorophenyl)-2,3,4,5-tetrahydro-3-hydroxy-2-(o-nitrophenylsulfonyl)pyridazine-3-propionic acid γ-lactone and 5-(o-fluorophenyl)-1-(o-nitrobenzenesulfonamido)-pyrrole-2-propionic acid. Substitution of 102 parts of 7-(o-fluorophenyl)-4,7-dioxoheptanoic acid and 88 parts of o-nitrobenzenesulfonic acid hydrazide for the 4,7-dioxo-7-phenylheptanoic acid and butanesulfonic acid hydrazide, respectively, called for in Example 3 and increasing the amount of benzene prescribed therein from 3,600 to 4,500 parts affords, by the procedure there detailed, 6-(o-fluorophenyl)-2,3,4,5-tetrahydro-3-hydroxy-2-(o-nitrophenylsulfonyl)pyridazine-3-propionic acid γ-lactone, of the formula

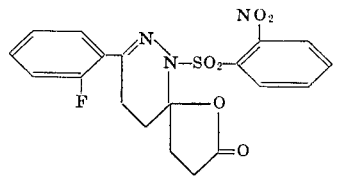

and 5-(o-fluorophenyl)-1-(o-nitrobenzenesulfonamido)pyrrole-2-propionic acid, of the formula

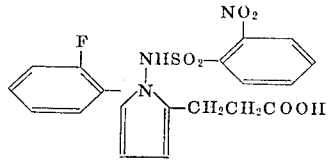

What is claimed is:

1. A compound of the formula

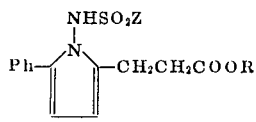

wherein Ph represents phenyl optionally substituted by methyl, halogen, or fewer than 3 lower alkoxys; R represents hydrogen or lower alkyl; and Z represents lower alkyl or phenyl optionally substituted by methyl, lower alkoxy, nitro, or fewer than four halogens.

2. A compound according to claim 1 having the formula

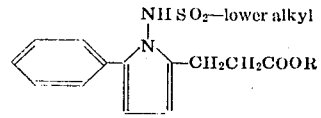

wherein R represent hydrogen or lower alkyl.

3. A compound according to claim 1 which is 1-methanesulfonamido-5-phenylpyrrole-2-propionic acid.

4. A compound according to claim 1 having the formula

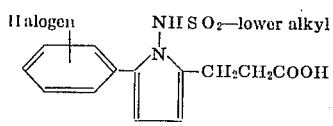

5. A compound according to claim 1 which is 5-(p-fluorophenyl)-1-methanesulfonamidopyrrole-2-propionic acid.

6. A compound according to claim 1 having the formula

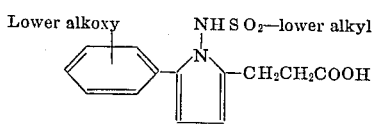

7. A compound according to claim 1 which is 5-(p-methoxyphenyl)-1-methanesulfonamidopyrrole-2-propionic acid.

8. A compound according to claim 1 having the formula

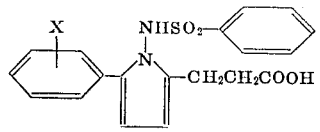

wherein X is halogen of atomic number less than 35.

9. A compound according to claim 1 which is 1-benzenesulfonamido-5-(p-chlorophenyl)pyrrole-2-propionic acid.

10. A compound according to claim 1 having the formula

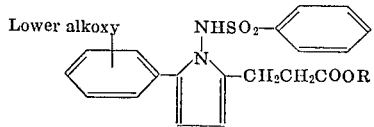

wherein R represents hydrogen or lower alkyl.

11. A compound according to claim 1 which is 1-benzenesulfonamido-5-(p-methoxyphenyl)pyrrole-2-propionic acid.

12. A compound according to claim 1 having the formula

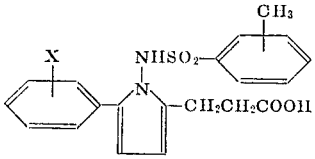

wherein X represents halogen of atomic number less than 53.

13. A compound according to claim 1 which is 5-(p-fluorophenyl)-1-(p-toluenesulfonamido)pyrrole-2-propionic acid.

14. A compound according to claim 1 having the formula

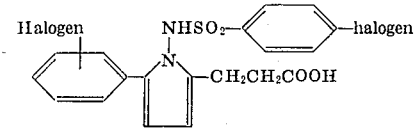

15. A compound according to claim 1 which is 5-(p-bromophenyl)-1-(p-chlorobenzenesulfonamido)pyrrole-2-propionic acid.

16. A compound according to claim 1 having the formula

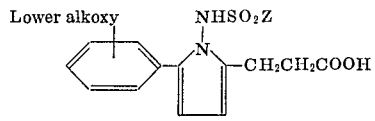

wherein Z represents phenyl substituted by fewer than 4 halogens of atomic number less than 53.

17. A compound according to claim 1 which is 1-(p-fluorobenzenesulfonamido)-5-(p-methoxyphenyl)pyrrole-2-propionic acid.

18. A compound according to claim 1 having the formula

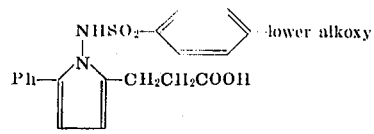

wherein Ph represents phenyl substituted by fewer than three lower alkoxys.

19. A compound according to claim 1 which is 1-(p-methoxybenzenesulfonamido)-5-(2,5-dimethoxyphenyl)-pyrrole-2-propionic acid.

20. A compound according to claim 1 having the formula

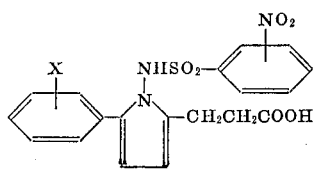

wherein X represents halogen of atomic number less than 53.

21. A compound according to claim 1 which is methyl 5-(p-bromophenyl)-1-(p-nitrobenzenesulfonamido)pyrrole-2propionate.

* * * * *